United States Patent [19]

Pfeifer et al.

[11] 4,275,239
[45] Jun. 23, 1981

[54] 1,10-DIALKYL-1,10-DECAMETHYLENEDIAMINES

[75] Inventors: Josef Pfeifer, Therwil; Heinz Peter, Rheinfelden, both of Switzerland

[73] Assignee: Ciba-Geigy Corporation, Ardsley, N.Y.

[21] Appl. No.: 118,133

[22] Filed: Feb. 4, 1980

Related U.S. Application Data

[62] Division of Ser. No. 954,811, Oct. 16, 1978, Pat. No. 4,225,701.

[30] Foreign Application Priority Data

Oct. 28, 1977 [CH] Switzerland ............... 13146/77

[51] Int. Cl.³ .......................................... C07C 87/14
[52] U.S. Cl. .................................. 564/511; 528/324; 528/330; 528/331; 528/338; 528/346; 528/347
[58] Field of Search ............ 260/583 P; 528/349, 528/338, 324, 346, 347, 330, 331

[56] References Cited

U.S. PATENT DOCUMENTS

| | | | |
|---|---|---|---|
| 3,150,117 | 9/1964 | Gabler | 260/78 |
| 3,352,831 | 11/1967 | Schmitt et al. | 260/78 |
| 3,563,959 | 2/1971 | Schade et al. | 260/78 |
| 3,839,295 | 10/1974 | Campbell et al. | 260/78 |
| 3,939,147 | 2/1976 | Hugelin et al. | 260/239 BC |
| 3,980,621 | 9/1976 | Campbell et al. | 260/78 |
| 4,100,111 | 7/1978 | Peter et al. | 528/116 |

FOREIGN PATENT DOCUMENTS

| | | | |
|---|---|---|---|
| 867384 | 10/1941 | France | 260/583 P |
| 1129275 | 10/1968 | United Kingdom | 260/583 P |
| 1132039 | 10/1968 | United Kingdom | 260/583 P |
| 1251320 | 10/1971 | United Kingdom | 260/583 P |

OTHER PUBLICATIONS

Magat, "Chemical Abstracts", vol. 50, Abstract No. 15095d (1956).
Nobis et al., "Chemical Abstracts", vol. 53, Abstract No. 6641i (1959).

*Primary Examiner*—John Doll
*Attorney, Agent, or Firm*—Luther A. R. Hall

[57] ABSTRACT

The partially crystalline polyamides according to the invention are obtained by reacting terephthalic acid, or an amide-forming derivative thereof, with a diamine of the formula

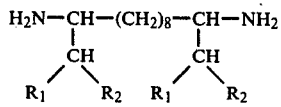

in which $R_1$ and $R_2$ singly or together are organic radicals. The reaction mixture can also contain up to 30% by weight of other amide-forming substances (aminocarboxylic acids or lactams, or mixtures of dicarboxylic acids and diamines), provided the formation of the partial crystallinity of the resulting polyamides is retained. The polyamides are suitable for producing moulded products of the most varied types. They are particularly applicable for producing filaments and fibres.

1 Claim, No Drawings

1,10-DIALKYL-1,10-DECAMETHYLENEDIAMINES

This is a divisional of application Ser. No. 954,811, filed on Oct. 16, 1978, now U.S. Pat. No. 4,225,701, issue fee paid.

The present invention relates to novel crystalline polyamides, to processes for producing them, and to their use for producing moulded articles.

In the U.S. Pat. No. 2,752,328 there are described linear fibre-forming polyamides from terephthalic acid and alkylenediamines which have 6 to 8 C atoms in the chain and which can be substituted in the positions 2 to 5 by one or two methyl groups, with the diamine having at most a total of 9 C atoms. Preferred diamines are, for example, 2,5-dimethylhexamethylenediamine, 2- or 3-methylhexamethylenediamine and 4-methyloctamethylenediamine. These prior known crystalline polyamides leave much to be desired however with regard to water absorption, stability to hydrolysis and/or dimensional stability under the action of moisture.

It is also known that polyamides from aliphatic or aromatic dicarboxylic acids and voluminous diamines are always transparent, that is to say amorphous; see for example the U.S. Pat. Nos. 2,864,807, 3,150,117 and 3,352,831, the Belgian Patent Specification No. 677,650 and the German Offenlegungsschrift No. 1,720,513. This last-mentioned German Offenlegungsschrift describes indeed generically transparent polyamides resistant to boiling and formed from aromatic dicarboxylic acids and unsubstituted or alkyl-substituted alkylenediamines which have up to 10 C atoms in the chain, and which are substituted on at least one of the two terminal C atoms by an alkyl group having 1-4 C atoms. The actual disclosure however is limited to transparent polyamides from aromatic dicarboxylic acids and alkylenediamines of the aforementioned type having at most 7 C atoms in the chain.

The object of the invention was therefore the preparation of novel crystalline polyamides which have high dimensional stability under heat, a lower absorption of water, improved stability to hydrolysis and increased dimensional stability under the action of moisture, and which are suitable for producing injection-moulding materials, and especially also for producing filaments and fibres. It has now been found that, surprisingly, novel crystalline polyamides can be produced from aromatic dicarboxylic acids and alkylenediamines having voluminous side chains.

The invention relates therefore to novel partially crystalline polyamides which can be obtained by a process comprising reacting essentially stoichiometric amounts of terephthalic acid, or of an amide-forming derivative thereof, with a diamine of the formula I

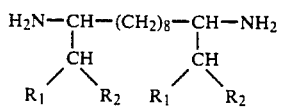   (I)

in which
$R_1$ is alkyl having 1–4 C atoms,
$R_2$ is alkyl having 1–8 C atoms, or
$R_1$ and $R_2$ together with the linkage C atom to which they are attached are in both cases cycloalkyl having 4–6 C atoms, in which process the reaction mixture contains optionally up to 5% by weight (relative to the total mixture) of an aminocarboxylic acid of the formula II

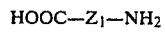   (II)

in which $Z_1$ is alkylene having 5 to 11 C atoms, or of a corresponding lactam, or alternatively up to 30% by weight of an essentially stoichiometric mixture of a dicarboxylic acid of the formula III

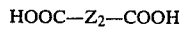   (III)

in which $Z_2$ is an aliphatic radical having at least 2 C atoms, or a carbocyclic-aromatic radical in which the carbonyl groups are bound to different ring C atoms which are not adjacent, or of an amide-forming derivative thereof, with a diamine of the formula IV

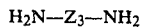   (IV)

in which $Z_3$ is

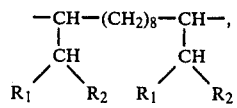

straight-chain alkylene having 2–12 C atoms, or a cycloaliphatic or araliphatic radical; and wherein the defined weight percentages in the case of amide-forming derivatives of terephthalic acid and of the dicarboxylic acid of the formula III relate to identical functional groups.

Alkyl groups denoted by $R_1$ and $R_2$ can be straight-chain or branched-chain, but are preferably straight-chain. The following may be mentioned as examples of alkyl groups as defined: the methyl, ethyl, n-propyl, isopropyl, n-butyl, sec-butyl, n-pentyl, n-hexyl, n-heptyl and n-octyl groups.

If $R_1$ and $R_2$ together with the linkage C atom to which they are attached form a cycloalkyl ring, it is preferably cyclopentyl or cyclohexyl.

If $Z_2$ is an aliphatic radical, it is in particular straight-chain alkylene having 2–12 C atoms, and preferably straight-chain alkylene having 4–10 C atoms. Alkylene groups $Z_3$ preferably contain 2–10 C atoms.

Carbocyclic-aromatic radicals denoted by $Z_2$ can be unsubstituted or substituted, for example by alkyl groups having 1–4 C atoms. They are for example monocyclic, condensed polycyclic or uncondensed bicyclic aromatic radicals, and in the case of the last-mentioned the aromatic nuclei can also be linked together by way of a bridging member, such as —O— or —$SO_2$—. $Z_2$ is particularly a 4,4'-biphenylene, 4,4'-diphenyl ether or 4,4'-diphenylsulfonyl group, the 2,4-, 3,6- or 2,7-naphthalene group, and especially the 1,3-phenylene group, but most preferably the 1,4-phenylene group.

$Z_3$ as a cycloaliphatic radical is, for example, the 1,3-cyclopentylene group, the 1,3- or 1,4-cyclohexylene group or the 4,4'-dicyclohexylmethane group, while $Z_3$ as an araliphatic radical is in particular the 1,4- or 1,3-xylylene group.

Preferred polyamides according to the invention are those which are obtained by reaction of 100 percent by weight of a mixture of essentially stoichiometric amounts of terephthalic acid, or an amide-forming derivative thereof, and a diamine of the formula I, that is heated to 50° C. From the dropping funnel is then added, with stirring, 116.6 g of 3,12-diamino-2,13-dimethyltetradecane, and the funnel is rinsed out with 1500 ml of ethanol. A solution is obtained on heating the reaction mixture to 80° C. It is subsequently cooled to 5° C., whereupon the formed salt precipitates. The salt is filtered off, and dried at 90° C. in vacuo; yield: 162.5 g (85% of theory).

15 g of this salt is sealed under nitrogen into a bomb tube and heated to 280° C. The salt initially melts to form a colourless liquid, which solidifies after about one hour as an opaque substance. The pre-condensation is discontinued after 2 hours, and the pre-condensate is removed from the bomb tube. Reduced viscosity of the pre-condensate, measured on a 5% solution in m-cresol at 25° C., is 0.56. The pre-condensate is pulverised, and is then polycondensed in the solid phase in a small flask under a pressure of 0.1 Torr for 12 hours at 280° C. The reduced viscosity of the polyamide obtained, measured on a 0.5% solution in m-cresol at 25° C., is 1.37 dl/g. In a differential calorimeter, the polyamide shows a melting peak with its maximum at 305° C., and a melting heat of 15.3 cal/g. A specimen of the melted polyamide is chilled with water, and then reheated in the differential calorimeter, and the following test values are obtained: glass transition temperature 148° C.; maximum of the crysallisation peak 210° C. with a heat of crystallisation of 10.1 cal/g; and maxima of the double melting peak at 286° C. and 308° C. with a melting heat of 9.1 cal/g. The white polyamide powder is moulded in a hydraulic press at 330° C. into the form of platelets having a thickness of about 0.5 mm; water absorption after 7 days' storage at 20°-25° C. with 65% relative humidity is 1.0% by weight, and water absorption after 7 days' storage in water is 1.7% by weight.

EXAMPLE 2

In a reaction vessel provided with stirrer, dropping funnel and reflux condenser, 11.72 g of terephthalic acid in a mixture of 250 ml of ethanol and 90 ml of water is heated to reflux temperature. There is then added dropwise through the dropping funnel, within 10 minutes, 24.0 g of 1,10-diamino-1,10-dicyclohexyldecane. The reaction mixture is stirred for 48 hours under reflux, and then cooled to 20°-25° C., whereupon the formed salt is filtered off. The yield after drying in vacuo is 34.8 g of salt (98% of theory).

15 g of this salt is polycondensed in the manner described in Example 1. The subsequent processing of the polyamide obtained is carried out at a moulding temperature of 350° C. The properties of the polyamide are summarised in Table 1.

EXAMPLE 3

5.15 g of diphenyl terephthalate and 5.05 g of 1,10-diamino-1,10-dicyclopentyldecane are melted at 210° C. in a condensing tube fitted with a device for introducing nitrogen. Whilst nitrogen is being passed over the melt, the temperature is raised in the course of 5 hours to 280° C. A part of the phenol which has been split off distills off during this time, and the melt gradually solidifies to form an opaque substance. The condensing tube is cooled and its contents are pulverised. The powder, which still contains phenol, is placed into a flask, and subjected under a pressure of 0.03 Torr for 9 hours to a temperature of 280° C. The thermoplastic shaping of the resulting polyamide into the form of platelets is carried out at a temperature of 350° C. The properties of the polyamide are summarised in the Table 1.

EXAMPLE 4

10.0 g of 4,13-diamino-3,14-diethylhexadecane and 10.06 g of diphenyl terephthalate are melted in a condensing tube at 220° C. under nitrogen, and held at this temperature for 4 hours. Whilst nitrogen is being passed through the melt, the temperature is subsequently raised in the course of 2 hours to 270° C., during which time the major part of the phenol that has been split off distills off. After 30 minutes, the tube is carefully evacuated to 14 Torr, and after a further 90 minutes finally to 0.1 Torr. Condensing is continued under these conditions for a further 30 minutes. On cooling, the melt solidifies to form a white-opaque substance. A filament drawn from the melt and stretched by hand shows under a heatable polarising microscope a sharp crystallite melting point of 235°-236° C. Further properties of the polyamide are given in Table 1.

EXAMPLE 5

In a 1 liter Erlenmeyer flask fitted with stirrer, dropping funnel and reflux condenser, 16.61 g of terephthalic acid in a mixture of 300 ml of water and 450 ml of ethanol is heated with stirring to 80° C. There is then added dropwise, through the dropping funnel, 36.86 g of 6,15-diamino-5,16-diethyleicosane, and the mixture is then refluxed for about 5 hours. It is subsequently cooled to 5° C., and the salt which has formed is filtered off. The residue is dried at 90° C. in vacuo, and the yield is 51.2 g (95.8% of theory).

15 g of this salt is sealed under nitrogen into a bomb tube and heated to 270° C. The temperature is lowered after 3 hours, and the solidified pre-condensate is removed and transferred to a condensing tube having a device for introducing nitrogen. The pre-condensate is melted under nitrogen at 270° C. and is then held, while nitrogen is being passed through, for 10 hours at this temperature. The melt on cooling solidifies into the form of a white opaque substance. The reduced solution viscosity of the resulting polyamide, measured on a 0.5% solution in m-cresol at 25° C., is 0.75 dl/g.

A filament drawn from this melt and stretched by hand shows under the polarising microscope a sharp melting point of 224°-225° C. Further properties are summarised in Table 1.

EXAMPLE 6

In the manner described in Example 2, 13.98 g of terephthalic acid and 26.3 g of 5,14-diamino-4,15-dimethyloctadecane are reacted in a mixture of 340 ml of ethanol and 100 ml of water. The formation of salt is finished after 8 hours. The salt is filtered off, and dried at 100° C. in vacuo; yield: 38.3 g of salt (95% of theory).

10 g of this salt is sealed under nitrogen into a bomb tube, and heated for 3 hours at 270° C. After cooling to 20°-25° C., the solidified melt is removed from the bomb tube and transferred to a condensing tube. With a continuous passing through of nitrogen, the precondensate is melted in the tube, and polycondensed in the melt for 8 hours at a temperature of 270° C.

The melt solidifies on cooling to form an opaque substance. The properties of the polyamide obtained are summarised in Table 1.

EXAMPLE 7

In the manner described in Example 1, the salt is firstly produced by reaction of 16.61 g of terephthalic acid and 28.45 g of 4,13-diamino-3,14-dimethylhexadecane in a mixture of 200 ml of water and 400 ml of ethanol; yield: 42.5 g (94% of theory).

10 g of this salt is heated in a bomb tube for 3 hours at 280° C. under nitrogen. After cooling, the precondensate is removed from the bomb tube and polycondensed in the melt in a condensing tube, while nitrogen is continuously passed through, for 6 hours at 280° C. The properties of the polyamide are summarised in Table 1.

EXAMPLE 8

In the manner described in Example 2, 16.61 g of terephthalic acid is reacted with 39.67 g of 6,15-diamino-5,16-di-n-propyleicosane in a mixture of 400 ml of ethanol and 100 ml of water. The formation of salt has finished after 6 hours and the yield, after filtration and drying, is 48.8 g (87% of theory).

10 g of this salt is polycondensed to a polyamide under the conditions described in Example 6. The properties of the polyamide obtained are summarised in Table 1.

EXAMPLE 9

72.98 g of 4,13-diamino-3,14-diethylhexadecane is added from a dropping funnel, with stirring and refluxing, to a suspension of 38.70 g of terephthalic acid in a mixture of 750 ml of ethanol and 250 ml of water. After 8 hours, the reaction mixture is cooled, and the formed salt is filtered off. Drying at 90° C. in vacuo yields 107.4 g of salt (D) (96% of theory).

9.5 g of this salt is mixed with 0.5 g of 11-aminoundecanoic acid, and the mixture is sealed under nitrogen in a bomb tube, and then immersed for 3 hours in a salt bath at 270° C., during which time the mixture melts to form a colourless liquid and polycondenses, as water is split off, to give a low-molecular precondensate. After cooling, the solidified opaque substance is remelted under nitrogen at 270° C. in an open polycondensing tube, and polycondensed at this temperature for 8 hours with the exclusion of air, during which time the reaction water is continuously being removed with the nitrogen passing through the melt. The properties of the copolyamide are summarised in Table 2.

EXAMPLE 10-11

22.87 g of 3,14-diamino-4,13-diethylhexadecane is heated in 300 ml of ethanol to 50° C. and to this solution is added, in one portion, 12.13 g of isophthalic acid. The isophthalic acid dissolves completely after a short time, whilst the solution attains the boiling point as a result of the neutralisation heat. The salt which has formed commences to precipitate after a few minutes. After cooling to room temperature, the salt is filtered off and dried at 80° C. in vacuo. The yield is 32.2 g of salt (E) (92% of theory).

2 g of this salt (E) is mixed with 8 g of salt (D) from Example 9, and the mixture is polycondensed to a copolyamide under the conditions given in Example 9.

The procedure is carried out in like manner with a mixture of 2.5 g of salt (E) from the preceding description and 7.5 g of salt (D) from Example 9.

The properties of the two copolyamides are summarised in Table 2.

EXAMPLES 12-14

14.61 g of adipic acid is heated in 100 ml of ethanol to 50° C., and a solution of 31.32 g of 4,13-diamino-3,14-diethylhexadecane in 80 ml of ethanol is added. The clear solution which is formed is gradually cooled to −5° C., whereupon the salt precipitates. The yield after filtration and drying is 31.4 g of salt (F) (68% of theory).

Various salt mixtures of the salt (F) obtained above and salt (D) from Example 9 are polycondensed under the conditions described in Example 9.

EXAMPLE 15

0.404 g of 1,12-diaminododecane, 0.407 g of sebacic acid and 15.46 g of salt (D) from Example 9 are weighed into a bomb tube, and polycondensed as described in Example 9.

The properties of the copolyamide are given in Table 2.

EXAMPLE 16

In the same manner are mixed 0.303 g of 1,12-diaminododecane and 0.249 g of terephthalic acid with 10.04 g of salt (D) from Example 9, and the mixture is polycondensed in the way described in Example 9.

The properties of the copolyamide are listed in Table 2.

TABLE 1

| Ex. No. | Acid | Diamine | reduc. solvent viscosity (1) | Glass transition temperature (DSC) °C. | Melting point (DSC) °C. | Melting heat (DSC) cal/g | Water absorption after 1 week's storage at 20°-25° C./65% relat. humidity. % by wt. |
|---|---|---|---|---|---|---|---|
| 2 | TPS | 1,10-diamine-1,10-dicyclohexyldecane | 0.88 | 172 | 332 | 12.4 | 0.8 |
| 3 | TPS | 1,10-diamino-1,10-dicyclopentyldecane | 0.72[(2)] | 163 | 342 | 18.6 | 0.7 |
| 4 | TPS | 4,13-diamino-3,14-diethylhexadecane | 0.78 | 150–160[(3)] | 235 | 11.9 | 0.4 |
| 5 | TPS | 6,15-diamino-5,16-diethyleicosane | 0.75 | 150–160[(3)] | 225 | 9.6 | 0.2 |
| 6 | TPS | 5,14-diamino-4,15-dimethyloctadecane | 0.82 | 151 | 215 | 7.1 | 0.5 |
| 7 | TPS | 4,13-diamino-3,14-dimethylhexadecane | 1.05 | 153 | 273 | 7.2 | 0.6 |
| 8 | TPS | 6,15-diamino-5,16-di-n- | 0.86 | 150–160[(3)] | 223 | 10.0 | 0.2 |

TABLE 1-continued

| Ex. No. | Acid | Diamine | reduc. solvent viscosity (1) | Glass transition temperature (DSC) °C. | Melting point (DSC) °C. | Melting heat (DSC) cal/g | Water absorption after 1 week's storage at 20°-25° C./65% relat. humidity. % by wt. |
|---|---|---|---|---|---|---|---|
| | | propyleicosane | | | | | |

TPS = terephthalic acid
DSC = measured in a differential calorimeter
(1) measured on 0.5% solution in m-cresol at 25° C. (dl/g)
(2) measured on 0.5% solution in dichloroacetic acid (dl/g)
(3) cannot be exactly evaluated in the DSC

TABLE 2

Copolyamides based on terephthalic acid/4,13-diamino-3,14-diethylhexadecane with proportions of other polyamide components

| Example No. | Basic component for the additional polyamide part | Amount added % by wt. | red. solution viscosity | Glass transition temperature (DSC) °C. | Melting point (DSC) °C. | Melting heat (DSC) cal/g |
|---|---|---|---|---|---|---|
| 9 | 11-aminodecanoic acid | 5 | 0.63 | 151 | 215 | 4 |
| 10 | IPS/4,13-diamino-3,14-diethylhexadecane (salt E) | 20 | 0.65 | 156 | 204 | 4 |
| 11 | IPS/4,13-diamino-3,14-diethylhexadecane (salt E) | 25 | 0.69 | 147 | 198 | 2.3 |
| 12 | ADS/4,13-diamino-3,14-diethylhexadecane (salt F) | 5 | 0.70 | 130–150(1) | 229 | 16.1 |
| 13 | ADS/4,13-diamino-3,14-diethylhexadecane (salt F) | 10 | 0.83 | 130–150(1) | 221 | 13.4 |
| 14 | ADS/4,13-diamino-3,14-diethylhexadecane (salt F) | 20 | 0.67 | 130–150(1) | 206 | 12.2 |
| 15 | 12,10-salt | 5 | 0.74 | 147 | 215 | 4.8 |
| 16 | TPS/1,12-diaminododecane | 5 | 0.73 | 150–160 | 225 | 12.2 |

IPS = isophthalic acid
ADS = adipic acid
12,10-salt = salt from equivalent amounts of 1,12-diaminododecane and sebacic acid
(1) cannot be exactly evaluated in the DSC The diamines used in the Examples 1–8 can be produced as follows:

(a) 3,12-Diamino-2,13-dimethyltetradecane 250 g (1 mol) of 3,12-diisopropyl-1,2-diaza-1,5,9-cyclododecatriene (diastereoisomeric mixture) is dissolved in 1000 ml of t-butanol in an autoclave with stirrer. After the addition of 25 g of a rhodium-/aluminium catalyst (5% by weight of rhodium), hydrogen is injected up to a pressure of 130–150 bars, and hydrogenation is then performed at 150°–180° C. until completion of hydrogen absorption. After cooling, the excess hydrogen is released, the suspension is drawn out by suction, and the catalyst is filtered off through a small amount of "Hyflo" (filtering agent). The filtrate is concentrated in a rotary evaporator, and the product is purified by distillation. There is obtained, as the main fraction, 238 g (94% of theory) of 3,12-diamino-2,13-dimethyltetradecane in the form of colourless oil [b.p. 106°–109° C./0.01 Torr; $n_D^{20}$=1.4600; IR (liquid) inter alia bands at 3355, 3278 and 1613 cm$^{-1}$].

(b) 5,14-Diamino-4,15-dimethyloctadecane

If there are used in the manner described under (a), instead of 250 g (1 mol) of 3,12-diisopropyl-1,2-diaza-1,5,9-cyclododecatriene, 61 g (0.2 mol) of 3,12-di-(2-pentyl)-1,2-diaza-1,5,9-cyclododecatriene (diastereoisomeric mixture) and correspondingly reduced amounts of catalyst and solvent, using otherwise the same procedure, there is obtained, as the main fraction, 48.4 g (77%) of theory of 5,14-diamino-4,15-dimethyloctadecane in the form of colourless oil [b.p. 155°–159° C./0.03 Torr; $n_D^{20}$=1.4632; IR (liquid) inter alia bands at 3246, and 1613 cm$^{-1}$].

(c) 4,13-Diamino-3,14-diethylhexadecane

If there are used in the manner described under (a), instead of 250 g (1 mol) of 3,12-diisopropyl-1,2-diaza-1,5,9-cyclododecatriene, 49 g (0.159 mol) of 3,12-di-(3-pentyl)-1,2-diazacyclododecane and correspondingly reduced amounts of catalyst and solvent, with the procedure otherwise remaining the same, there is obtained, after chromatographical purification and distillation, 26.8 g (54% of theory) of 4,13-diamino-3,14-diethylhexadecane in the form of colourless oil [b.p. 141°–143° C./0.004 Torr; $n_D^{20}$=1.4666; IR (liquid) inter alia bands at 3378, 3278 and 1613 cm$^{-1}$].

(d) 1,10-Diamino-1,10-dicyclopentyldecane

If there are used in the manner described under (a), instead of 250 g (1 mol) of 3,12-diisopropyl-1,2-diaza-1,5,9-cyclododecatriene, 200 g (0.666 mol) of crude 3,12-dicyclopentyl-1,2-diaza-1,5,9-cyclododecatriene (diasterioisomeric mixture) and correspondingly reduced amounts of catalyst and solvent, the procedure otherwise being the same, there is obtained, after chromatographical purification and distillation, 39.2 g (19% of theory) of 1,10-diamino-1,10-dicyclopentyldecane in the form of colourless oil [b.p. 174°–178° C./0.002 Torr; $n_D^{20}$=1.4885; IR (liquid) inter alia bands at 3355, 3278 and 1613 cm$^{-1}$].

(e) 1,10-Diamino-1,10-dicyclohexyldecane

If there are used in the manner described under (a), instead of 250 g (1 mol) of 3,12-diisopropyl-1,2-diaza-1,5,9-cyclododecatriene, 328.5 g (1 mol) of 3,12-dicyclohexyl-1,2-diaza-1,5,9-cyclododecatriene (diastereoisomeric mixture) and correspondingly reduced amounts of catalyst and solvent, with otherwise the same procedure, there is obtained, as the main fraction, 304 g (90% of theory) of 1,10-diamino-1,10-dicyclohexyldecane in the form of colourless oil [b.p. 190°–193° C./0.05 Torr; $n_D^{20}=1.4944$; IR (liquid) inter alia bands at 3355, 3278 and 1613 cm$^{-1}$].

(f) 6,15-Diamino-5,16-diethyleicosane

If there are used in the manner described under (a), instead of 250 g (1 mol) of 3,12-diisopropyl-1,2-diaza-1,5,9-cyclododecatriene, 74.8 g (0.2 mol) of 3,12-di-(3-heptyl)-1,2-diazacyclododecane (diastereoisomeric mixture) and correspondingly reduced amounts of catalyst and solvent, with otherwise the same procedure, there is obtained, after chromatographical purification and distillation, 29.9 g (40% of theory) of 6,15-diamino-5,16-diethyleicosane in the form of colourless oil [b.p. 170° C./0.01 Torr; $n_D^{20}=1.4662$; IR (liquid) inter alia bands at 3278 and 1613 cm$^{-1}$].

The 1,2-diaza-1,5,9-cyclododecatriene and 1,2-diazacyclododecane, used as starting products, can be produced by the methods described in the German Offenlegungsschriften Nos. 2,330,087 and 2,549,403.

(g) 4,13-Diamino-3,14-dimethylhexadecane

If there are used in the manner described under (a), instead of 250 g (1 mol) of 3,12-diisopropyl-1,2-diaza-1,5,9-cyclododecatriene, 87.3 g (0.31 mol) of 3,12-di-(2-butyl)-1,2-diaza-1,5,9-cyclododecatriene (diastereoisomeric mixture) and correspondingly reduced amounts of catalyst and solvent, with otherwise the same procedure, there is obtained, as the main fraction, 74.7 g (85% of theory) of 4,13-diamino-3,14-dimethylhexadecane in the form of colourless oil [b.p. 143°–5° C./0.05 Torr; $n_D^{20}=1.4639$; IR (liquid) inter alia bands at 3330 and 1626 cm$^{-1}$].

(h) 6,15-Diamino-5,16-dipropyleicosane

If there are used in the manner described under (a), instead of 250 g (1 mol) of 3,12-diisopropyl-1,2-diaza-1,5,9-cyclododecatriene, 35.9 g (0.09 mol) of crude 3,12-di-(4-octyl)-1,2-diaza-1,5,9-cyclododecatriene and correspondingly reduced amounts of catalyst and solvent, with otherwise the same procedure, there is obtained, after chromatographical purification and bulb-tube distillation, 8.8 g (24% of theory) of 6,15-diamino-5,16-dipropyleicosane in the form of colourless oil [$n_D^{20}=1.4655$; IR (liquid) inter alia bands at 3380, 3300 and 1623 cm$^{-1}$].

We claim:

1. A diamine of the formula Ia

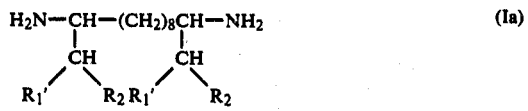

in which $R_1'$ is alkyl having 2–4 C atoms, and $R_2$ is alkyl having 1–8 C atoms.

* * * * *